United States Patent [19]

Cummins

[11] 3,761,040

[45] Sept. 25, 1973

[54] REMOTE CONTROLLED HELICOPTER TRANSPORT DEVICE AND METHOD

[76] Inventor: Phil F. Cummins, 2831 Fifth Ave., Fort Worth, Tex.

[22] Filed: Mar. 8, 1972

[21] Appl. No.: 232,841

[52] U.S. Cl. .................. 244/2, 214/512, 180/9.2
[51] Int. Cl. ............................................. B64d 3/00
[58] Field of Search .................. 244/2, 115, 116, 244/77 R, 77 C, 114; 318/16, 587; 317/147; 180/6.5, 2, 9.2; 46/243 AV, 243 LV, 244 A, 244 B, 244 C, 244 D; 214/512; 340/16 C; 343/225

[56] References Cited
UNITED STATES PATENTS
2,873,870  2/1959  Sowerby ........................ 180/9.22
3,533,483  10/1968  Ballinger ........................ 180/9.52

Primary Examiner—Milton Buchler
Assistant Examiner—D. C. Butler
Attorney—D. Carl Richards et al.

[57] ABSTRACT

The specification discloses a remote controlled vehicle for transporting a helicopter. The vehicle comprises a low profile chassis dimensioned to be received underneath the fuselage of a helicopter. Crawler tracks are mounted on opposite sides of the chassis, and motors are mounted within the chassis for advancing the crawler tracks. Arms are mounted on the chassis and are selectively movable to engage the undercarriage of the helicopter. A hydraulic system selectively moves the arms between lowered and raised positions. A radio receiver is mounted in the chassis for controlling the motors and the hydraulic system in order to control the movement of the vehicle and to control the arms of the vehicle. In order to remotely control the vehicle, a portable radio transmitter is operated to transmit radio control signals to the radio receiver. In the preferred embodiment, the transmitter generates a plurality of unique tone combinations each corresponding to a different desired operation of the vehicle.

17 Claims, 20 Drawing Figures

PATENTED SEP 25 1973

REMOTE CONTROLLED HELICOPTER TRANSPORT DEVICE AND METHOD

FIELD OF THE INVENTION

This invention relates to remote controlled vehicles and methods of operating same, and more particularly relates to remote controlled tracked vehicles for transporting aircraft such as helicopters in forward areas.

THE PRIOR ART

Many helicopter aircraft used in military operations are provided with skid undercarriages. When such helicopters land in forward areas, wheels and a towing bar must be attached to the undercarriage of the helicopter. Men or a conventional vehicle are then used to pull the helicopter by means of the towing bar to a desired location for maintenance, repair or temporary storage. In many instances, the forward areas in which such helicopters operate include relatively unimproved terrain such as cleared jungle areas or the like. Conventional methods of towing helicopters in such areas are thus hampered due to the roughness of the terrain, and also due to the fact that the turning radius of the helicopter is relatively large when the towing bar is utilized. Such problems are intensified when the terrain is soft due to inclement weather. Moreover, when manpower is utilized to tow the helicopters, the inefficienies and military inappropriateness of utilizing a large number of men in this manner is apparent. When conventional vehicles such as jeeps or the like are utilized to tow the helicopters, problems arise in transporting and maintaining the vehicles in the forward area.

The need thus exists for a relatively lightweight, yet rugged vehicle which may be sling-loaded underneath a helicopter and carried to a forward area. The vehicle should be able to operate with a minimum of manpower, and should be able to conveniently and efficiently transport helicopters and other loads to any desired area over any type of terrain. In addition, the vehicle should be able to ascend and descend grades without endangering the stability of its load.

SUMMARY OF THE INVENTION

In accordance with the present invention, a transport vehicle includes a chassis dimensioned for being received beneath a structure to be lifted. Crawler tracks are mounted on opposite sides of the chassis and motors are provided for advancing the crawler tracks. Arms are carried by the chassis and are movable to engage and lift the structure for transportation to a desired location.

In accordance with another aspect of the invention, a vehicle for transporting a helicopter includes a low profile chassis dimensioned to be received underneath the fuselage of a helicopter. Crawler tracks are mounted on opposite sides of the chassis, and motors are mounted within the chassis for advancing the crawler tracks. Arms are mounted on the chassis and are selectively movable to engage the undercarriage of the helicopter. A hydraulic system is provided to move the arms between lowered and raised positions. A radio receiver is mounted in the chassis for controlling the motors and the hydraulic system. A radio transmitter is remotely operable to transmit radio control signals to the radio receiver for control thereof.

In accordance with a more specific aspect of the invention, a crawler transport vehicle includes a chassis having a greater width than height and dimensioned to be received underneath the fuselage of a helicopter. Crawler tracks are mounted on opposite sides of the chassis and are operable to move in either of two directions. Separate electric motors are provided to drive each of the crawler tracks. Rechargeable batteries are provided to power the motors. Arms depend from the chassis and are movable between raised and lowered positions, with clamps on the arms being adapted to attach to the undercarriage of the helicopter. A hydraulic system is mounted in the chassis and is operable to raise and lower the arms. Switches are operable by electrical control signals to control the operation of the electric motors and the arms. A portable transmitter is remotely operable to generate electrical control signals wherein the chassis may be moved underneath a helicopter, and may be operated to raise the helicopter off the ground and to transport the helicopter to the desired location.

In accordance with another aspect of the invention, a method of transporting an aircraft includes generating radio control signals at a remote location. The control signals are received at a chassis having crawler tracks and the tracks are advanced in response to the control signals such that the chassis is moved underneath the aircraft. Arms extending from the chassis are attached to the undercarriage of the aircraft and the arms are raised in response to control signals to thereby raise the aircraft off the ground. The crawler tracks are then advanced in response to the control signals to transport the aircraft to the desired location.

DESCRIPTION OF THE DRAWINGS

For a more complete understanding of the present invention, and for further objects and advantages thereof, reference is now made to the following description taken in conjunction with the accompanying drawings, in which.

DESCRIPTION OF THE PREFERRED EMBODIMENTS

Figure 1:
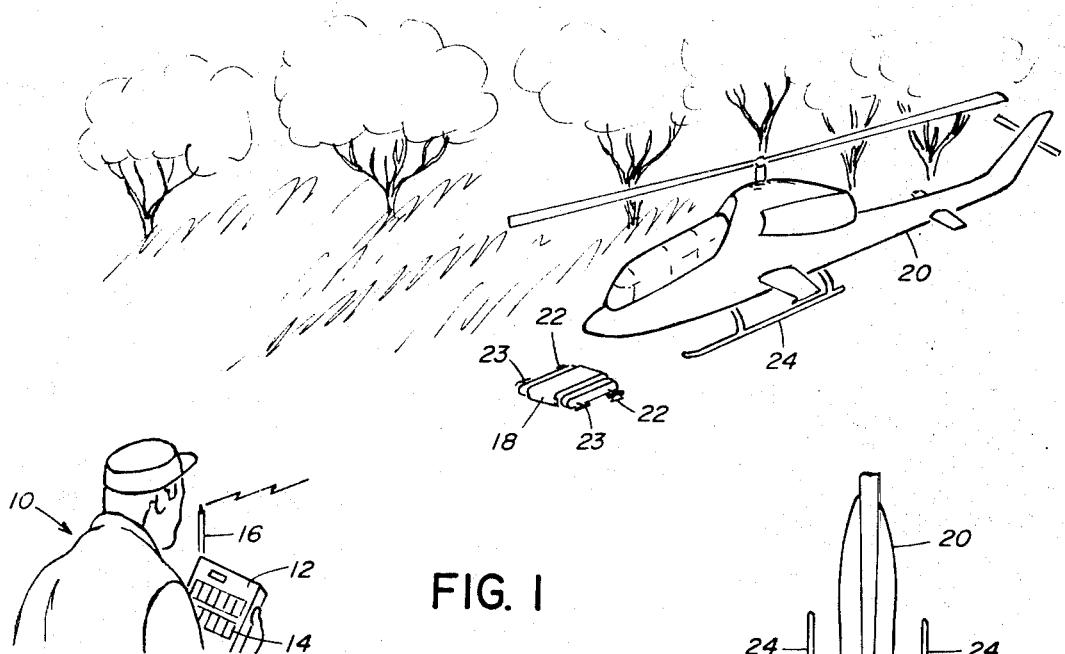
FIG. 1 illustrates a somewhat diagrammatic perspective view of the preferred embodiment of the present remote controlled tracked vehicle during use in transporting a helicopter.

FIG. 1 illustrates an operator 10 holding a portable radio transmitter casing 12. Casing 12 includes a plurality of keys 14 which are depressed by the operator 10 to generate unique sequences of tone signal combinations from an antenna 16. These tone signal combinations are received by a radio receiver mounted in a tracked vehicle 18. The tone signals control electrical and hydraulic circuitry within the vehicle 18 such that the vehicle 18 may be maneuvered underneath the fuselage of an aircraft such as a helicopter 20. Arms 22 and 23 on the vehicle 18 are then clamped to the undercarriage skids 24 of the helicopter. The operator 10 then operates selected ones of the keys 14 to raise the arms 22 and 23 to lift the helicopter 20 off the ground. The vehicle 18 may then be controlled by the operator 10 to transport the helicopter 20 to a desired location.

The present system is extremely useful in transporting military helicopters in forward areas wherein the terrain is uneven or treacherous. The vehicle 18 is constructed in a rugged manner, and yet is light enough that the vehicle may be sling-lifted into the forward areas by a helicopter. In the preferred embodiment, the vehicle 18 is constructed with a low profile such that the vehicle may be received underneath the fuselage of helicopters such as the ARIC Cobra and URIB Huey.

In the preferred embodiment, the hydraulic system which operates the arms 22 and 23 has the capacity to raise and maintain helicopters above the ground at any level up to approximately 12 inches above the ground. The arms 22 and 23 may be individually raised and lowered such that the orientation of the helicopter 20 may be selectively varied to enable transportation of the helicopter over uneven ground.

Figure 2:
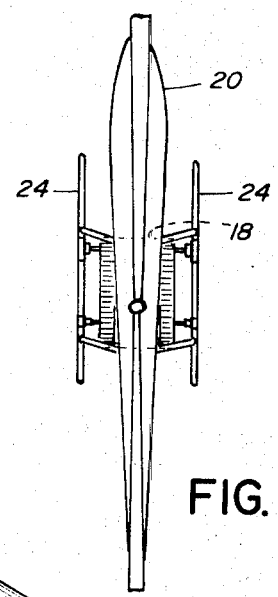
FIG. 2 is a top view of the present vehicle during transportation of the helicopter.

FIG. 2 illustrates the positioning of the vehicle 18 beneath the fuselage of the helicopter 20 and between the spaced apart skids 24 of the helicopter undercarriage. The vehicle 18 is constructed with a wide ground-hugging configuration in order to provide substantial traction so that the helicopter 20 may be transported over a wide variety of terrain. It will be understood that in some instances a pair of vehicles 18 could be utilized on opposite sides of the helicopter 20 for transport thereof. Due to the unique radio system of the invention, separate vehicles 18 according to the invention may be operated in the same area without interference problems, as each radio receiver in the vehicle is provided with a different tone coding arrangement.

Figure 3:
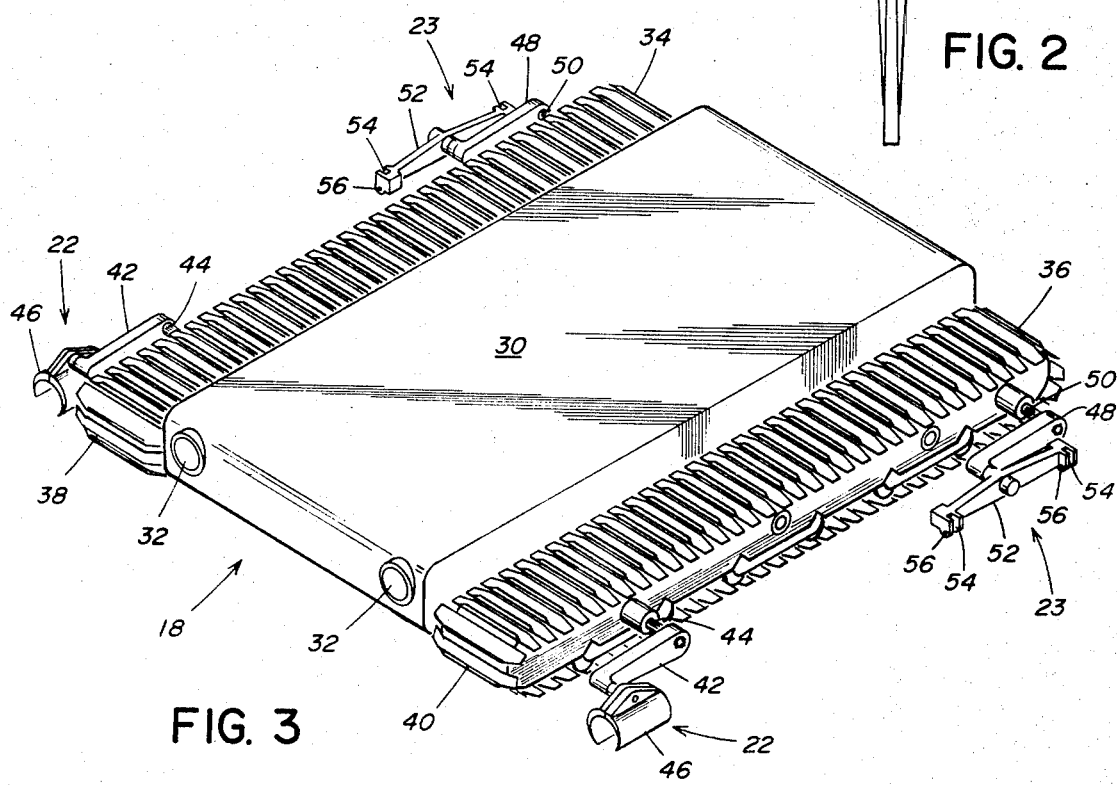
FIG. 3 is a perspective view of the remote controlled transport vehicle of the invention.

FIG. 3 illustrates a perspective view of the vehicle 18 in greater detail. The vehicle includes a chassis 30 which comprises a generally rectangular metal body which contains batteries, electric motors, electric control circuitry, hydraulic control circuitry and the radio receiver. Headlights 32 are mounted on the front of the chassis 30 to enable night operation. Crawler tracks 34 and 36 are mounted on opposite sides of the chassis 30 and comprise a plurality of grousers 38 and 40 mounted along drive chains, not shown. The drive chain is advanced by a drive sprocket, not shown, which is directly driven through a gear box by an electric motor. The electric motor is reversible so that the crawler tracks 34 and 36 may be advanced in either direction. Additionally, each of the electric motors within the chassis 30 may be individually operated so that the tracks 34 and 36 may be individually advanced to enable the vehicle 18 to turn in any direction.

The forward arms 22 comprise generally L-shaped members 42 connected at one end to a shaft 44. Shaft 44 is rotatable by a hydraulic piston in a manner to be subsequently described in order to raise or lower members 42. Clamps 46 are pivotally mounted on the forward end of the members 42 and comprise a pair of opposed clamp members adapted to be firmly attached to the skid of a helicopter undercarriage. Clamps 46 may be formed of a somewhat resilient material, or alternatively may comprise a pair of opposed metal clamp members urged together by a spring mechanism.

Rearwardly located arms 23 comprise L-shaped members 48 connected at the rearward end to shafts 50 which may be rotated by suitable hydraulic members to be subsequently described. Lift members 52 are pivotally attached to the forward ends of the members 48. Lift members include slots 54 in each end thereof in order to receive extensions from the undercarriage skid of the helicopter. Pins are then applied through apertures 56 in order to attach the lift members 52 to the helicopter skid. Other clamping devices can be used in place of the lift members 52 if desired.

Figure 4:
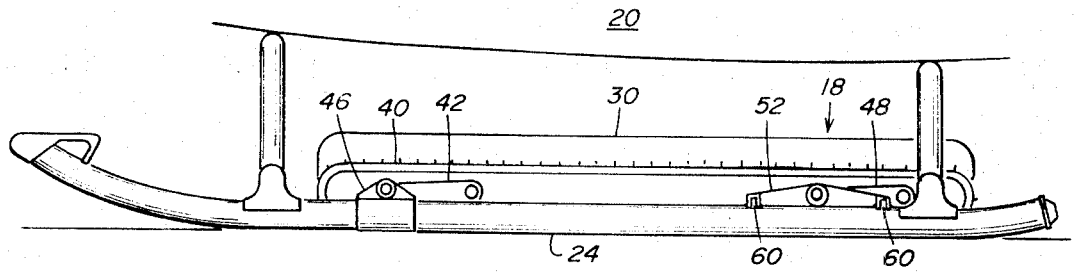
FIG. 4 is a side view of the remote controlled vehicle with its arms in the lower position and attached to the undercarriage of a helicopter.

FIG. 4 illustrates a side view of the vehicle 18 positioned underneath the fuselage of a helicopter 20. The clamp 46 is attached to the skid 24 of the helicopter while the lift member 52 is connected by pins to extensions 60 upstanding from the skid 24.

Figure 5:
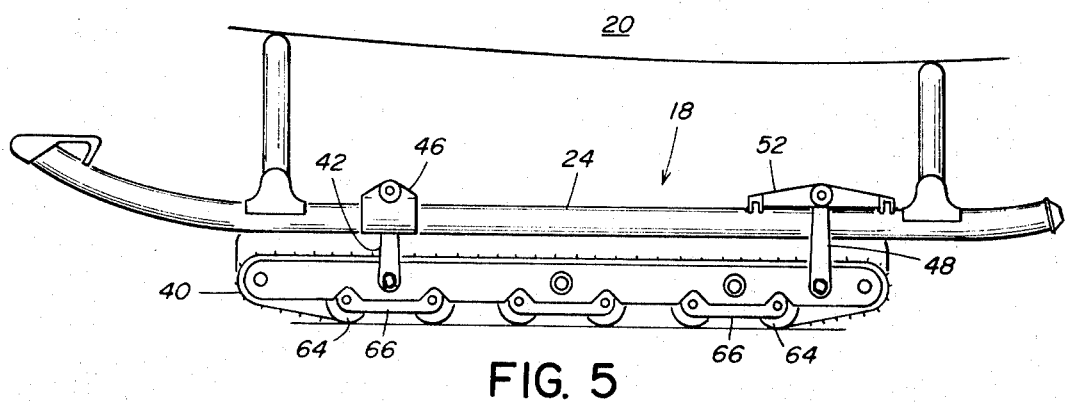
FIG. 5 illustrates the vehicle shown in FIG. 4 with the arms raised to thereby enable transportation of the helicopter.

In FIG. 5, the vehicle 18 has been commanded by operation of the portable transmitter casing 12 to raise the helicopter skid 24 off the ground. The arms 42 and 48 have been pivoted to vertical positions, thereby swinging the skid 24 upwardly over the transport vehicle 18. Due to the pivotal mounting of the clamp 46 and the lift member 48, the helicopter is maintained in a generally horizontal position during all stages of the lifting process. The operator will generally be located so he can view vehicle 18 and helicopter 20 in order to maintain the helicopter in a generally horizontal position during the lifting process. In operation, vehicle 18 is commanded by the operator 10 to transport the helicopter to the desired location, wherein the helicopter is then lowered to the position shown in FIG. 4, and the clamps 46 and the lift members 48 are removed from the skid. FIG. 5 also illustrates bogies 64 pivotally mounted in support brackets 66 about which the grousers 40 travel.

Figure 6:
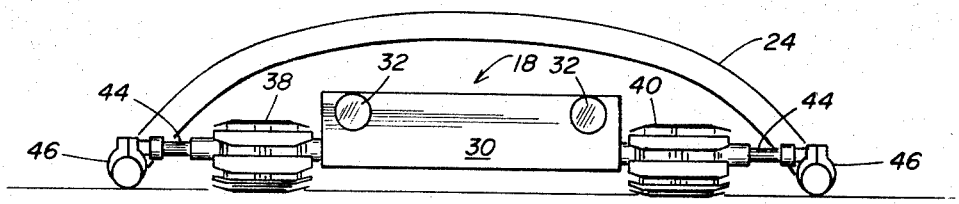
FIG. 6 illustrates a front view of the vehicle shown in FIG. 4 with the arms in the lower position and attached to the undercarriage of the helicopter.

FIG. 6 illustrates a front view of the vehicle 18 when positioned underneath the undercarriage of the helicopter and after clamps 46 are attached to the skid 24. FIG. 6 clearly illustrates the low profile construction of the vehicle 18, which in combination with the relatively wide crawler tracks provides excellent traction and stability during operation.

Figure 7:
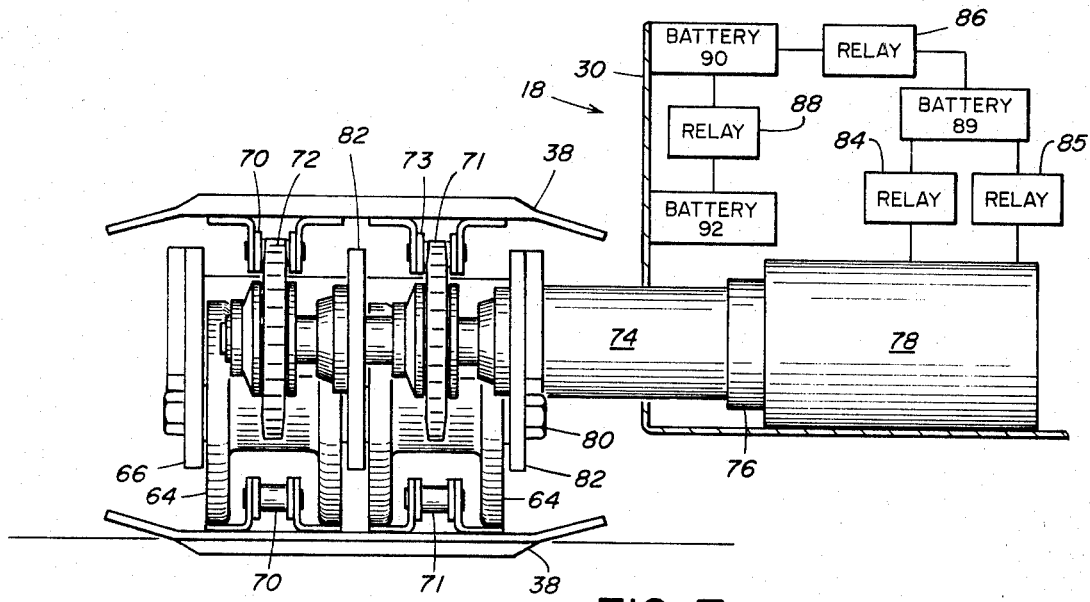
FIG. 7 is a sectional view of the forward portion of the crawler track drive mechanism of the vehicle.

FIG. 7 illustrates a sectional view of a forward portion of one of the crawler track mechanisms. Each of the crawler tracks are advanced by identical systems. As previously noted, grousers 38 are connected to drive chains 70 and 71. A pair of drive wheels 72 and 73 are connected to a shaft 74 which extends through the casing 30 to a gear reduction box 76. Slip clutches will generally be connected between the wheels 72 and 73 and the shaft 74 in order to prevent damage to the system in case one of the tracks becomes stuck. An electric motor 78 is operable to rotate the shaft 74 through the gear reduction box 76 to rotate the drive wheels 72 and 73 to advance the crawler tracks. A pair of bogie wheels 64 are rotatable about a bolt 80 which extends through suport members 82.

Motor 78 is connected through relays 84, 85, 86 and 88 to three permanent storage batteries 89, 90 and 92. In the preferred embodiment, each of the batteries 89, 90 and 92 comprise a heavy duty 12-volt automotive battery. Selective operation of relays 84, 85, 86 and 88 enables the speed of operation of the drive motor 78 to be selected to provide forward, reverse, low, intermediate and high speed operation of the vehicle. For example, energization of relay 84 provides 12 volts to operate the vehicle in the forward direction at a low speed. Energization of relays 84 and 86 operates the motor 78 with 24 volts to provide an intermediate speed, and operation of relays 84, 86 and 88 operates the motor with 36 volts to provide a high speed. Energization of relay 85 operates the motor 78 in the reverse direction. As will be subsequently shown, relays 84, 85, 86 and 88 may be selectively operated by depression of keys 14 on the portable transmitter casing 12. The transmitter casing 12 generates unique sequences of tone signal commands which are received by the receiver within the chassis 30, the receiver then generating signals which operate selected ones of the relays 84, 85, 86 and 88 for control of the motor 78.

In the preferred embodiment, the electrical drive motors of the device comprise 2 ½ horsepower electrical reversible motors which may operate at up to 2,800 rpm. The drive output of the motors is reduced 16:1 by the gear reduction box 76. The vehicle in an embodiment which worked well in practice was capable Of ascending and descending 60° slopes and traveled at a speed of 4½ miles per hour.

Figure 8:
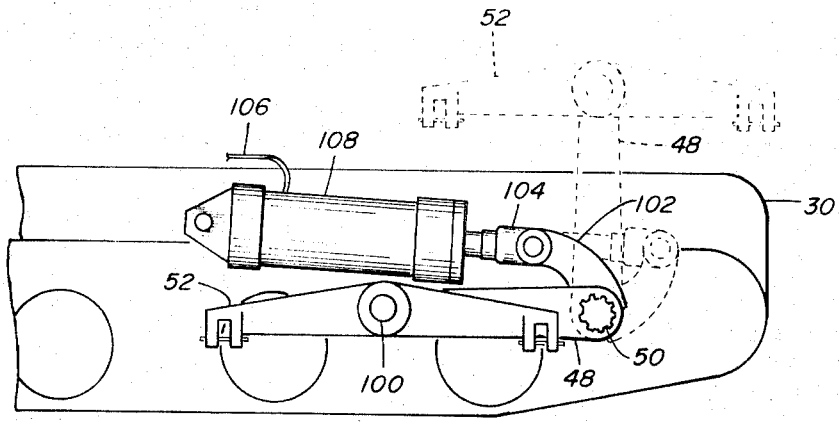
FIG. 8 is a side view of one of the lift arms of the vehicle shown in lowered and raised positions.

FIG. 8 illustrates the hydraulic lift mechanism of the invention, with the track mechanism omitted from the figure for clarity of illustration. As previously noted, the lift member 52 is pivotally connected at a pivot point 100 on the lift arm 48. Lift arm 48 is connected through a shaft 50 to a location inside the chassis 30. The end of the shaft 50 is connected to a curved arm 102 which is pivotally connected to the end of a hydraulic piston 104. The piston 104 is movable in response to hydraulic pressure applied via lines 106 to a hydraulic cylinder 108. When the piston 104 is in the retracted position as illustrated, the arm 102 is in the solid line position and the lift member 52 is in the lowered position. When the piston 104 is in the extended position as shown by the dotted lines, the arm 102 is moved clockwise in order to rotate the shaft 50 and to move the arm 48 to the vertical position. The lift member 52 is then moved to the raised position in order to raise the attached helicopter. It will be understood that by properly positioning the arm 102 with hydraulic pressure that the lift member 52 may be positioned at any location intermediate the extreme raised and lowered positions.

Figure 9:
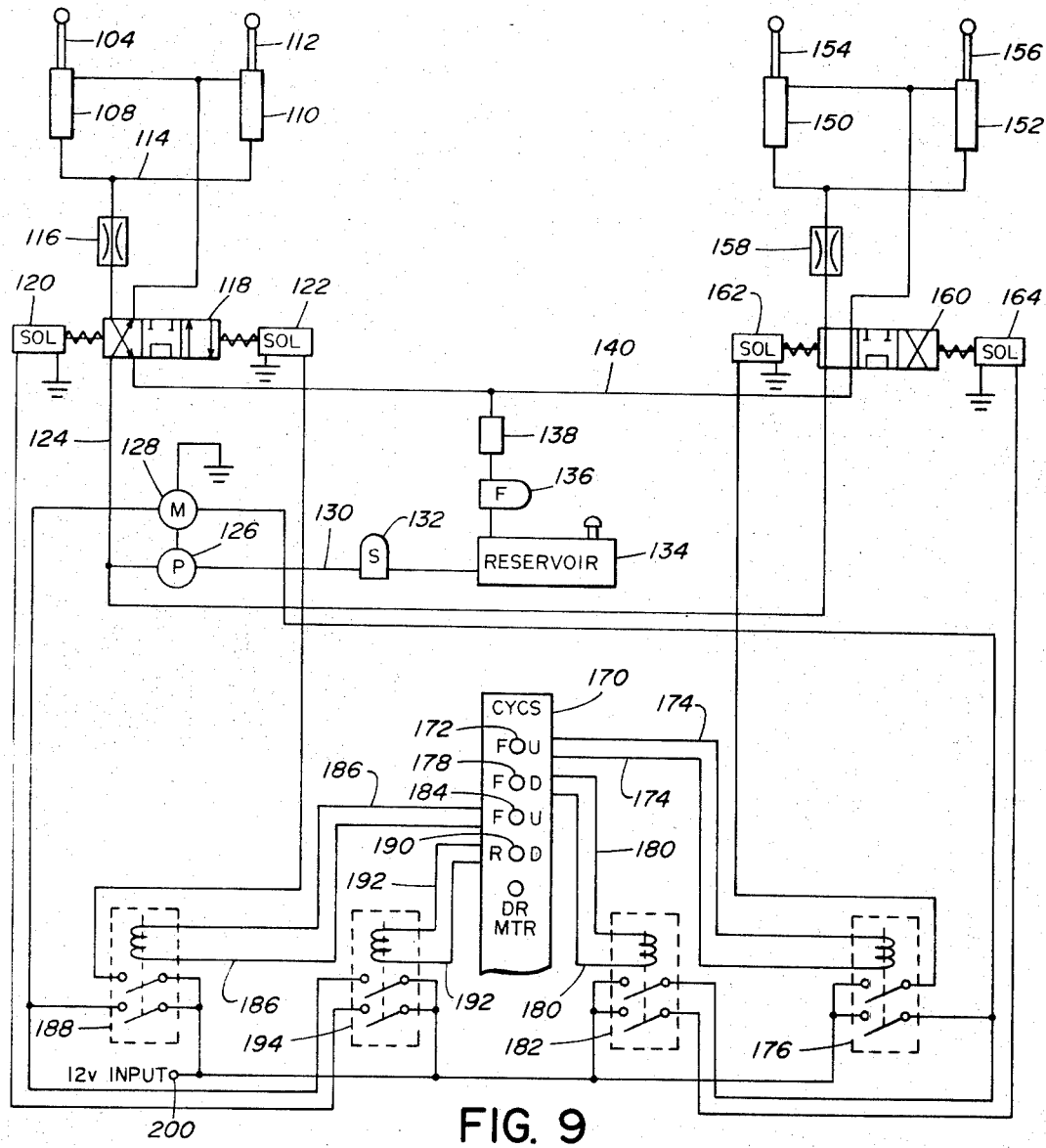
FIG. 9 is a combined schematic of the electrical and hydraulic circuitry of the invention.

FIG. 9 illustrates the hydraulic and electrical system of the invention for operation of the lift arm mechanisms. A pair of rear hydraulic cylinders 108 and 110 are provided with movable shafts 104 and 112 for operation of the rear lift mechanisms. A fluid line 114 connects each of the cylinders 108 and 110 through a two-way restrictor 116 to one side of a three-way spring return, blocked center, solenoid operated valve 118. Operaton of the valve 118 is effected by solenoids 120 and 122. Fluid is applied through hydraulic line 124 from a pump 126 which is operated by a motor 128.

Hydraulic fluid is supplied via hydraulic line 130 through a sump 132 from a reservoir 134 mounted within the chassis of the vehicle 18. A filter 136 is connected to a 0–50 psig relief valve 138 to a hydraulic line 140 which is applied through the valve 118 to the return lines of the cylinders 108 and 110.

A pair of hydraulic cylinders 150 and 152 are provided with movable output shafts 154 and 156 in order to control the operation of the forward arms 22 of the vehicle. The input side of the cylinders 150 and 152 are connected through a two-way restrictor 158 through a three-position spring return, blocked center, hydraulic valve 160. The operation of valve 160 is controlled by a pair of solenoids 162 and 164. Hydraulic fluid line 140 is connected to the return sides of each of the cylinders 150 and 152 for return to the reservoir 134.

Electrical control of the solenoids 120, 122, 162 and 164, in addition to control of motor 128, is provided by the output of the radio receiver 170 to be subsequently described. The Foward Hydraulic Cylinder Up Terminal 172 of the receiver is connected via wires 174 to a two-pole, two position relay 176. The Front Hydraulic Cylinder Down Terminal 178 of the receiver is connected via wires 180 to a two-pole, two position relay 182. The Rear Hydraulic Cylinder Up Terminal 184 of the receiver 170 is connected via wires 186 to a two-pole, two position relay 188, while the Rear Hydraulic Cylinder Down Terminal 190 of the receiver is connected via wires 192 to a two-pole, two position relay 194. A 12-volt battery input is provided from the batteries previously noted at terminal 200.

The remaining output terminals of the radio receiver 170 are connected through suitable electrical relay switches for control of the electrical motors which operate the crawler tracks of the invention, as previously noted.

In operation of the hydraulic circuitry shown in FIG. 9, the operator 10 depresses the proper key 14 on the portable transmitter 12 and a uniquely coded tone sequence is transmitted to the receiver 170. When the proper tone sequence is received, a signal is provided at terminal 172 and the relay 176 is actuated. Electrical power is then transmitted from terminal 200 through the relay 176 to energize solenoid 162. Electrical power is provided from the relay 176 to the motor 128 in order to operate the pump 126. Pressurized hydraulic fluid is then applied from pump 126 through valve 160 and flow restrictor 158 in order to operate the fluid cylinders 150 and 152 to extend the output shafts 154 and 156. When the Front Up key 14 is released by the operator 10, electrical energy is cut off to the solenoid 162 and the motor 128, and the valve 160 then shifts to the center blocked position. The shafts 154 and 156 are then maintained at the desired degree of extension.

Reception by the receiver 170 of a proper coded signal also generates a signal at terminal 184 in order to energize relay 188. Electrical current is then applied to operate the solenoid 122 and hydraulic fluid is applied to the cylinders 108 and 110 in order to cause the rear lift mechanism to be raised.

When it is desired to lower the front lift mechanism, a proper signal is transmitted from the transmitter casing 12 and is received by the receiver 170. An electrical signal is generated from terminal 178 and energizes relay 182. Electrical signals then operate solenoid 164 in order to shift the valve 160 to the down position to permit oil to flow from the down side of the cylinders 150 and 152 to the reservoir 134. When the arms 22 and 23 have settled the helicopter at ground level, the down key 14 is released by the operator. The pump 126 and motor 128 are thus de-energized and the valves shift to the neutral center blocked position. Operation of the rear cylinders 108 and 110 when the electrical signal is generated from terminal 190 is similar to that previously described.

Figure 10:
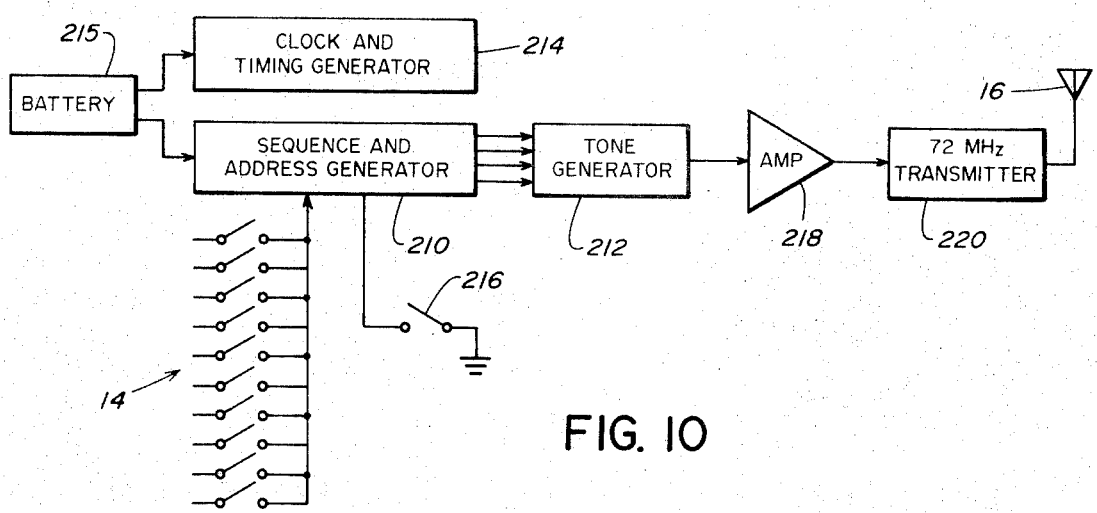
FIG. 10 is an electrical block diagram of the portable transmitter of the invention.

FIG. 10 is a block diagram of the transmitter circuitry within the portable transmitter casing 12. Depression of one of the function keys 14 by the operator 10 operates the sequence and address generator 210 to apply timed control signals for operation of four tone generators 212. A clock and timing generator 214 controls the timing sequence of the generator 210. In the preferred embodiment, the sequence and address generator 210 comprises an electrical matrix which generates a unique sequence of timed control signals upon depression of each of the function keys 14. A battery 215 is provided to power the circuitry. Operation of the eleventh on-off key 216 causes generator 210 to transmit a unique three tone combination sequence which is required to turn on the electrical circuits at the remote controlled vehicle 18. The four tone generators 212 are thus sequentially operated to generate tone signals which are amplified through an audio amplifier 218 and are transmitted via a 72 MHZ transmitter 220 through the antenna 16.

Upon depression of one of the function buttons 14, a unique sequence of tones, called a command frame, is generated from the tone generators 212. The command frame is repeatedly transmitted under the control of the clock and timing generator 214 at a rate of six frames per second. Each command frame is subdivided into eight time intervals denoted as time slots. One tone out of the four possible tones generated by the tone generators 212 appears in each time slot. The first three time slots are allocated to the system address which is predetermined by connections within the address generator 210. This system address consists of a particular sequence of three tones in these first three time slots.

Due to the fact that any of four tones may be generated in each time slot, a total capability of 57 unique tone addresses exist per radio channel. Thus, by assigning different addresses to different vehicles to be used in the same area, each of the vehicles may be used without fear of radio interference between the units. An important aspect of the invention is that five simultaneous commands may be executed by the operator by simultaneous depression of buttons on the transmitter 12.

A suitable transmitter for use with the present device is manufactured and sold by the Motorola Company as the 10-5P.R.C. Transmitter/Receiver system.

In the preferred embodiment, the transmitter shown in FIG. 10 is provided with a power output of 100mw, with a frequency stability of 0.005 per cent. A battery life of approximately 20 hours may be provided with a mercury battery. The casing 12 preferably comprises a cast aluminum casing having two mating halves sealed by a gasket. In the preferred embodiment, the casing is provided with a weight of approximately six pounds and has dimensions of approximately 8" × 6½" × 2¼". The present transmitter may be used at ranges up to 500 feet. Although the transmitter has been described with respect to the preferred embodiment, it will be understood that other circuitry could be utilized to provide unique sequences of tone combinations for control of the remote vehicle.

Figure 11:
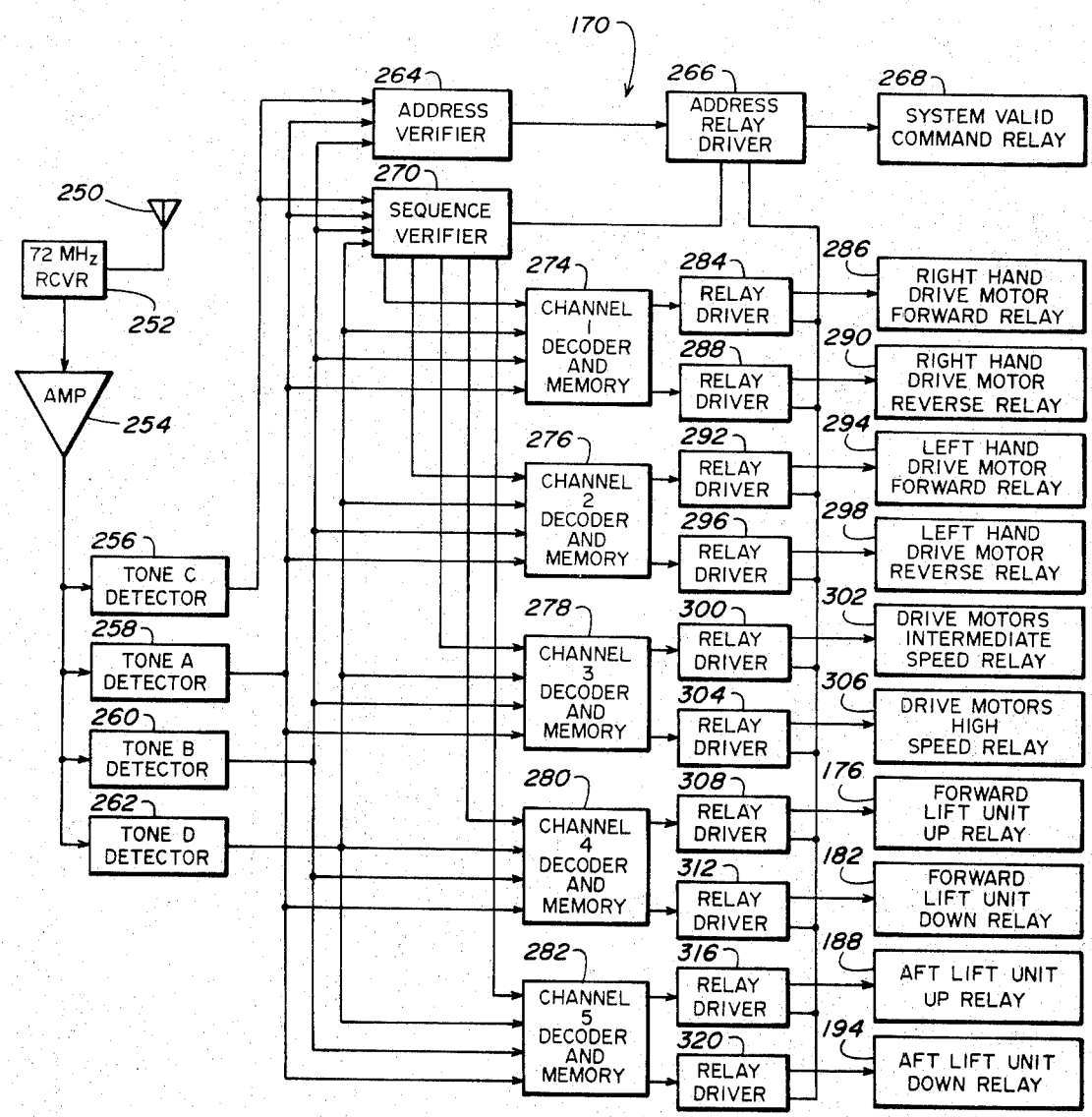
FIG. 11 is a block diagram of the radio receiver located within the vehicle chassis.
Figure 12:
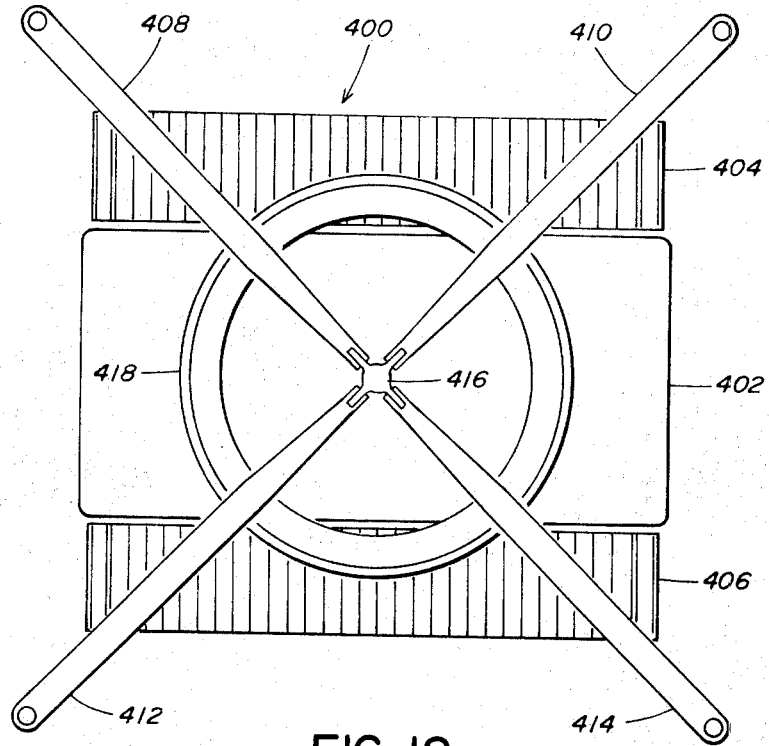
FIG. 12 is a top view of a second embodiment of a remote controlled tracked vehicle according to the invention.

FIG. 11 illustrates a block diagram of the receiver 170 circuitry. An antenna 250 mounted within the chassis of the vehicle senses the modulated coded signals transmitted from the transmitter casing 12 and passes the signals through a 72 MHZ receiver 252. The tone signals are applied through an audio amplifier 254 and are simultaneously applied through four tuned tone detectors 256–262. Each of the detectors 256–262 detects only one of the four tones generated by the tone generators 212 at the transmitter. The outputs of the detectors 256–260 are applied to an address verifier circuit 264, which generates an enable signal only when the proper address tones have been received. The enable signal operates an address relay driver circuit 266 which energizes a system valid command relay 268 which allows operation of the remaining relay circuits of the invention. In case the proper address is not received, none of the remaining control relays of the system may be operated. The outputs of the detectors 256–262 are also applied to the sequence verifier 270 which generates an enable signal to the driver 266 only when the proper sequence of tones has been received. The driver 266 must receive enable signals from both verifiers 264 and 270 in order to energize the relay 268.

The four outputs of the detectors 256–262 are applied to five channels of decoders and memory circuits 274–282. Each of the decoder circuits 274–282 is capable of generating two outputs. Each of the outputs is a mutually exclusive pair, so that the system is capable of providing ten control functions arranged in five mutually exclusive pairs or five on-off-neutral control functions. For example, the decoder memory circuit 274 is configured to detect a particular unique tone sequence for generation of an output signal to energize a relay driver 284 which energizes the Right Hand Drive Motor Forward relay 286. Energization of relay 286 causes power to be applied to the electrical motor which operates the right hand crawler tracks in the forward direction. The output of the relay driver 284 is also applied as an inhibit signal to the driver 266 to inhibit the driver in case of a short circuit.

The decoder memory 274 is configured also to detect the mutually exclusive sequence of tones to operate the relay driver 288 to energize the Right Hand Drive Motor Reverse relay 290 to drive the right crawler track in the reverse. In a similar manner, the decoder memory 276 is operable to detect unique tone sequences for operation of either the relay driver 292 for energization of the Left Hand Drive Motor Forward relay 294, or to energize the relay driver 296 for energization of the Left Hand Drive Motor Reverse relay 298. The decoder memory 278 is operable to operate the relay driver 300 and the Drive Motor Intermediate Speed relay 302. The decoder memory 278 is also operable to sense a unique tone combination for operation of the relay driver 304 for energizing the Drive Motor High Speed relay 306.

Operation of the relays 302 and 306 interconnect the three batteries 89, 90 and 92 (FIG. 7) to provide speed control to the system in the manner as previously described. The decoder memory 280 is operable to energize the relay driver 308 and the Forward Lift Unit Up relay 176, previously noted in FIG. 9, or to operate the relay driver 312 to energize the Forward Lift Unit Down relay 182 (FIG. 9). Similarly, the decoder memory 282 is operable to energize the relay driver 316 and the Aft Lift Unit Up relay 188 (FIG. 9), or the relay 320 to energize the Aft Lift Down relay 194 (FIG. 9). It will thus be seen that reception of a unique coded combination by the receiver 170 results in the generation of a control signal for operation of a relay to perform a desired control function.

FIGS. 12–15 illustrate a second embodiment of a remote controlled vehicle 400 for use in transporting aircraft such as helicopters. Remote controlled vehicle 400 is operated by a portable transmitter in the same manner as the preferred embodiment previously described. In some instances, a cable may be attached to the device 400 in order to transmit control functions thereto, but in most instances a control cable will be utilized only in case of malfunction of the remote transmitter. Vehicle 400 comprises a chassis 402 including a pair of crawler tracks 404 and 406 located on opposite sides thereof in the general manner as that previously described. Inside chassis 402 are batteries, drive motors and hydraulic systems similar to that previously described.

Figure 13:
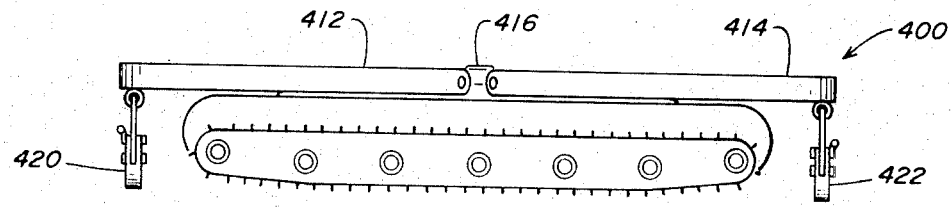
FIG. 13 is a side view of the vehicle shown in FIG. 12.
Figure 14:
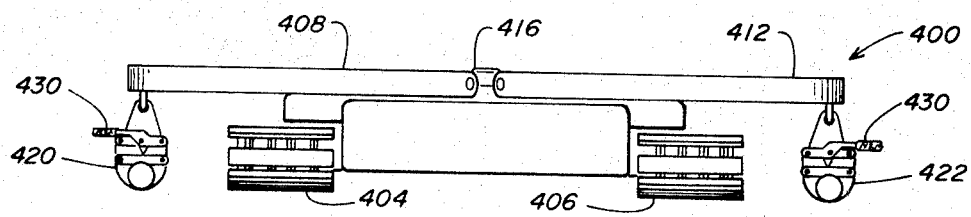
FIG. 14 is a front view of the vehicle shown in FIG. 12.

In place of the pivotable arms previously described, the vehicle 400 utilizes four arms 408–414 which are pivotally connected at the inner ends thereof to a post 416. A ring 418 is operable by a suitable hydraulic system to be raised and lowered. The ring 418 abuts the underside of the arms 408–414 in order to selectively raise or lower the arms. FIG. 13 illustrates a side view of the vehicle 400 illustrating clamps 420 and 422 for connection to the undercarriage skid of a helicopter. As shown in FIG. 14, clamps 420 and 422 comprise a pair of movable jaws which may be opened and closed by manual operation of levers 430.

Figure 15:
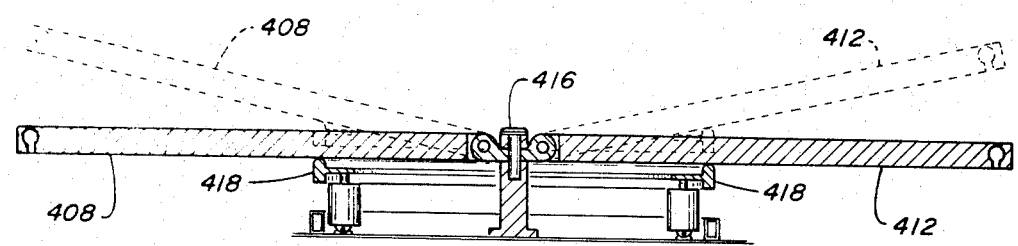
FIG. 15 is an illustration of the arm lift mechanism of the invention illustrating the arms in the lowered and raised positions.

FIG. 15 illustrates the operation of raising and lowering the vehicle arms of the vehicle 400. As previously noted, each of the arms are pivoted at the interior end thereof to the post 416. The ring 418 is movable up and down by the selective application of hydraulic pressure from a system similar to that previously described. The hydraulic system is controlled by the output of the radio receiver in response to coded tone sequences. When the ring 418 is in the lowered position, the arms 408 and 412 are in the lowered position for connection to the undercarriage skids of a helicopter. When the ring 418 is raised by hydraulic pressure, the arms 408 and 412 are raised to the raised position to raise the helicopter off the ground for transportation to a remote location.

Figure 16:
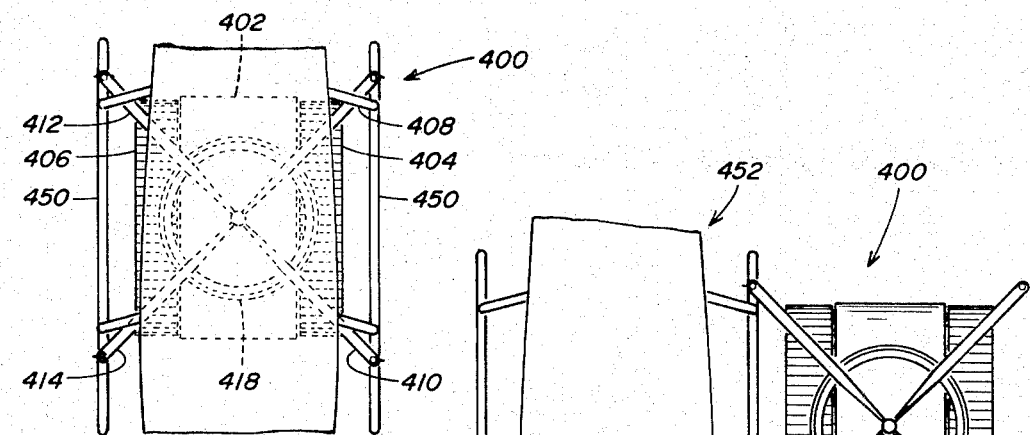
FIG. 16 is a top view of the vehicle during transport of a helicopter, with the fuselage of the helicopter being omitted for clarity of illustration.

FIG. 16 illustrates a typical use of the vehicle 400 when the vehicle is maneuvered underneath the undercarriage of a helicopter and is attached by the clamps to the skids 450 of a helicopter. In FIG. 16, the fuselage of the helicopter has been removed for ease of illustration. The ring 418 is then raised to lift the arms 408–414 to raise the helicopter. The crawler tracks 404 and 406 are then advanced to transport the helicopter to the desired location.

Figure 17:
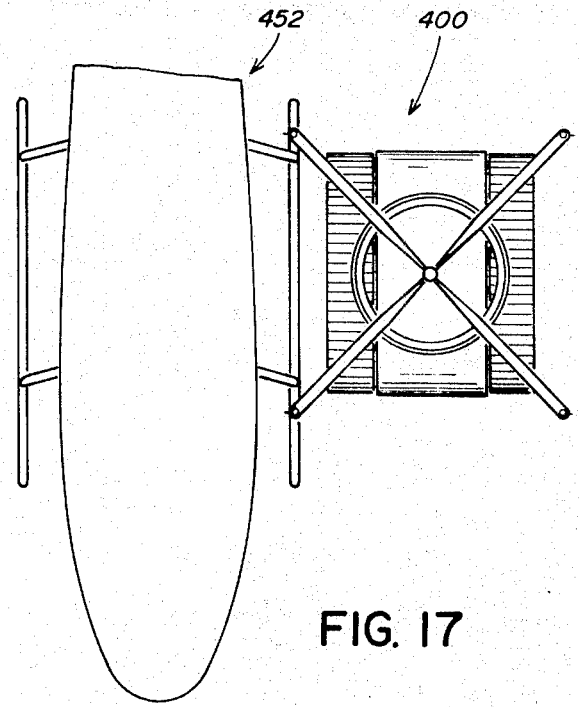
FIG. 17 is a top view of the tracked vehicle shown in FIG. 12 attached to one side of a helicopter for movement thereof.

FIG. 17 illustrates an alternate use of the device 400 for sideways movement of a helicopter 452 by attachment of two of the movable arms of the vehicle to the undercarriage skids of the helicopter. In another embodiment, not shown, a second remote controlled vehicle may be utilized on the other side of the helicopter 452 in order to transport the vehicle.

Figure 18:
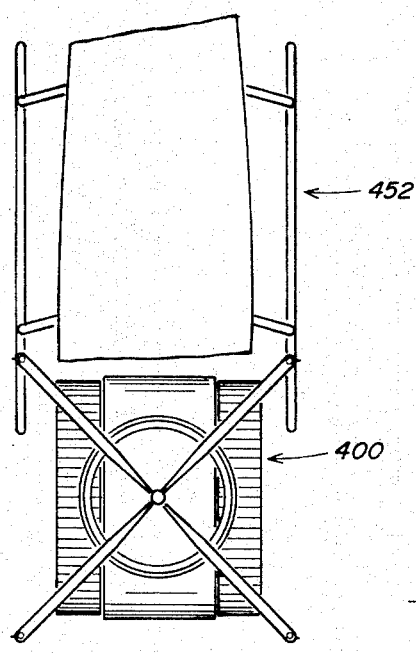
FIG. 18 is a top view of the tracked vehicle shown in FIG. 12 attached to a helicopter in a towing position.

FIG. 18 illustrates the use of the remote controlled vehicle in a towing or pushing operation for a helicopter 452. The vehicle 400 may be utilized to load equipment on board an airplane or the like in this pushing or towing configuration.

Figure 19:
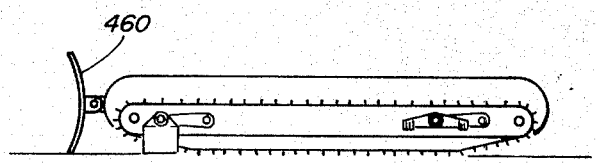
FIG. 19 is a side view of the present tracked vehicle with a plow attachment.

FIG. 19 illustrates the use of the invention as an earth-moving device by means of the attachment of a plow 460 on the forward end thereof. In this embodiment, either of the disclosed embodiments of the invention may be utilized.

Figure 20:
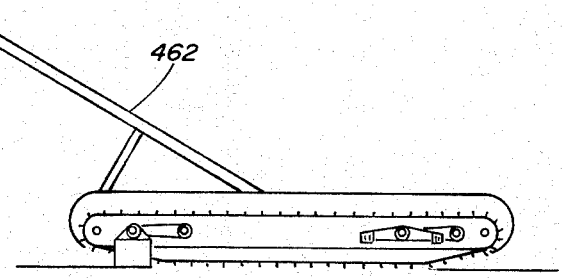
FIG. 20 is a side view of the present tracked vehicle with an A-frame attachment.

FIG. 20 illustrates the use of the remote controlled vehicle of the invention as a lifting device by means of the attachment of an A-frame 462 thereon. The attachments shown in FIGS. 19 and 20 are meant to be illustrative of a number of various attachments for use with the invention. It is envisioned that the present invention may be sling-loaded into a jungle area and the plow 460 attached to the front end thereof to enable clearing of a landing area. The A-frame 462 may then be attached to enable lifting of various crates and other equipment as required. Upon the landing of helicopters on the cleared landing area, the remote controlled device may then be utilized to transport the helicopter to a desired concealed area in the manner previously described.

It will thus be seen that the present invention is useful for the transportation of a wide variety of items and particularly transportation of aircraft such as helicopters in a forward area. The system may be accurately remotely controlled to perform a variety of functions by a relatively unskilled operator. The system is extremely rugged and not subject to maintenance problems, and may be operated in a wide range of terrains. The use of the radio system wherein a plurality of unique tone sequences may be generated for control of the remote controlled device is advantageous in that the device is not plagued by interference problems and due to the fact that a plurality of devices may be operated in a small area.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. Apparatus for transporting a helicopter comprising:

a low profile chassis dimensioned to be received underneath the fuselage of a helicopter, crawler tracks mounted on opposite sides of said chassis, motor means mounted within said chassis for advancing said crawler tracks, arm means mounted on said chassis and selectively movable to engage the undercarriage of the helicopter, hydraulic means for moving said arm means between lowered and raised positions, radio receiver means mounted in said chassis for controlling said motor means and said hydraulic means, and radio transmitter means remotely operable to transmit radio control signals to said radio receiver.

2. The apparatus of claim 1 wherein said radio transmitter means comprises:

a casing for being held by an operator, a plurality of buttons for being depressed by the operator, tone generator means within said casing and operable in response to depression of said buttons to generate a plurality of unique tone combinations, each of said tone combinations corresponding to different desired operations.

3. The apparatus of claim 2 wherein said radio receiver means comprises:

means for receiving said unique tone combinations, and means for controlling a different operation of said apparatus in response to each of said tone combinations.

4. The apparatus of claim 2 wherein each of said unique tone combinations comprises eight sequential tones of various frequencies.

5. The apparatus of claim 1 wherein said arm means comprises:

an arm linkage pivotable between lowered and raised positions, clamp means on the end of said arm linkage for attachment to the undercarriage of a helicopter, and hydraulic cylinder means connected to pivot said arm linkage.

6. The apparatus of claim 1 and further comprising:

a plurality of electric switches connected to control the operation of said motor means and said hydraulic means, the output of said radio receiver means controlling the operation of said electric switches.

7. The apparatus of claim 1 wherein said motor means comprises:

a pair of electric motors each connected through a drive linkage to one of said crawler tracks, a plurality of battery means each having different output levels, and means responsive to the output of said radio receiver means for selectively connecting one of said battery means to said electric motors to control the speed thereof.

8. Crawler transport apparatus comprising:

a chassis having greater width than height and dimensioned to be received underneath the fuselage of a helicopter, crawler tracks mounted on opposite sides of said chassis and operable to move in either of two directions, separate electric motors for each of said crawler tracks, battery means for said motors, arm means depending from said chassis and movable between raised and lowered positions, clamps on said arm means for attachment to the undercarriage of said helicopter, a hydraulic system within said chassis and operable to raise and lower said arm means, switch means operable by electrical control signals to control the operation of said electric motors and said arm means, and means remotely operable to selectively generate said electrical control signals wherein said chassis may be moved underneath a helicopter, may raise said helicopter off the ground, and may transport said helicopter to a desired location.

9. The transport apparatus of claim 8 and further comprising:

a portable radio transmitter having a plurality of control buttons, means within said transmitter for generating a unique tone combination for each control button depressed, and radio receiver means in said chassis for controlling the operation of said electric motors and hydraulic system in response to reception of said tone combinations.

10. The transport apparatus of claim 9 wherein each said tone combination comprises a plurality of time slots, a portion of said time slots containing a sequence of tones representative of an address code, the remainder of said time slots containing unique tone combinations representative of the control button depressed.

11. The transport apparatus of claim 10 wherein a plurality of command functions for operation of said motors and hydraulic system may be simultaneously transmitted in a single unique tone combination.

12. The apparatus of claim 8 wherein said arm means comprises:

hydraulic cylinder means, mechanical linkage means movable between raised and lowered positions by said cylinder means, and clamps mounted on said linkage means for attachment to the undercarriage of the helicopter.

13. The method of transporting an aircraft comprising:

generating radio control signals at a remote location, receiving said control signals at a chassis having crawler tracks, advancing the crawler tracks in response to said control signals such that the chassis is moved underneath the aircraft, attaching arms extending from the chassis to the undercarriage of the aircraft, raising the arms in response to the control signals to thereby raise the aircraft off the ground, and advancing the crawler tracks in response to said control signals to transport the aircraft to a desired location.

14. The method of claim 13 and further comprising:

generating electrical control signals in response to reception of said radio control signals, operating switches in response to said electrical control signals, applying pressurized hydraulic fluid to hydraulic cylinders in response to operation of said switches, and moving said arms in response to said hydraulic fluid.

15. The method of claim 13 and further comprising:

generating electrical control signals in response to reception of said radio control signals, operating switches in response to said electrical control signals, applying the electrical output from a battery in response to operation of said switches, and operating an electrical motor with said electrical output to advance said crawler tracks.

16. The method of transporting a helicopter comprising:

moving a tracked vehicle beneath the fuselage of the helicopter, attaching movable arms extending from the vehicle to the undercarriage of the helicopter, raising the movable arms to lift the helicopter, and moving the tracked vehicle to the desired location while adjusting the position of the movable arms to maintain the helicopter in a generally horizontal position even while moving along uneven terrain.

17. The method of claim 16 and further comprising:

generating coded tone signals from a location remote from the tracked vehicle, controlling the movement of the tracked vehicle and the movabe arms in response to reception of the coded tone signals.

* * * * *